(12) United States Patent
Li et al.

(10) Patent No.: US 11,965,594 B2
(45) Date of Patent: *Apr. 23, 2024

(54) ELECTRONIC PARKING BRAKE MECHANISM

(71) Applicant: Jing-Jin Electric Technologies Co., Ltd., Beijing (CN)

(72) Inventors: Jianwen Li, Beijing (CN); Ran Sun, Beijing (CN); Lena Jin, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 62 days.

This patent is subject to a terminal disclaimer.

(21) Appl. No.: 17/757,684

(22) PCT Filed: Jan. 10, 2020

(86) PCT No.: PCT/CN2020/071267
§ 371 (c)(1),
(2) Date: Jun. 17, 2022

(87) PCT Pub. No.: WO2021/128494
PCT Pub. Date: Jul. 1, 2021

(65) Prior Publication Data
US 2023/0020347 A1 Jan. 19, 2023

(30) Foreign Application Priority Data
Dec. 26, 2019 (CN) .......................... 201911364191.9

(51) Int. Cl.
*F16H 63/34* (2006.01)
*B60T 1/00* (2006.01)
(Continued)

(52) U.S. Cl.
CPC .......... *F16H 63/3425* (2013.01); *B60T 1/005* (2013.01); *F16D 63/006* (2013.01);
(Continued)

(58) Field of Classification Search
CPC ............. F16H 63/3416; F16H 63/3425; F16H 63/3433; F16H 63/3466; F16H 63/3491;
(Continued)

(56) References Cited

U.S. PATENT DOCUMENTS 3,703,941 A * 11/1972 Ohie ...................... B60T 1/005
192/219.5
4,369,867 A * 1/1983 Lemieux ................ B60T 1/005
192/219.5
(Continued)

FOREIGN PATENT DOCUMENTS

CN 202691007 U 1/2013
CN 104534084 A 4/2015
(Continued)

OTHER PUBLICATIONS

European Search Report dated Jan. 27, 2023 issued in EP Application No. 20907683.5.
(Continued)

*Primary Examiner* — Richard M Lorence
(74) *Attorney, Agent, or Firm* — ArentFox Schiff LLP

(57) ABSTRACT

An electronic parking mechanism that includes a parking cam assembly, a pawl assembly and a parking gear. The parking cam assembly includes a parking guide shaft and a parking cam that is sleeved on the parking guide shaft, and one side of the parking cam is provided with an arc protrusion along a circumferential direction so that as the parking cam rotates, the pawl assembly is in a first position where the pawl assembly parks in the parking gear and a second position where the pawl assembly parks out the parking gear, respectively. The pawl assembly includes a pawl and a pawl shaft, an upper part of the pawl contacts the parking cam, the pawl shaft is provided on a side of the pawl that can rotate around the pawl shaft.

13 Claims, 3 Drawing Sheets

(51) Int. Cl.
*F16D 63/00* (2006.01)
*F16H 63/30* (2006.01)

(52) U.S. Cl.
CPC ....... *F16H 63/304* (2013.01); *F16H 63/3433* (2013.01); *F16H 63/3466* (2013.01); *F16H 63/3491* (2013.01); *F16H 2063/3056* (2013.01)

(58) Field of Classification Search
CPC .......... F16H 63/304; F16H 2063/3056; B60T 1/005; B60T 1/062; F16D 63/006
See application file for complete search history.

(56) References Cited

U.S. PATENT DOCUMENTS

| | | | | |
|---|---|---|---|---|
| 5,170,869 | A * | 12/1992 | Svab | B60T 1/005 |
| | | | | 192/219.5 |
| 11,761,535 | B2 * | 9/2023 | Hou | F16H 63/3425 |
| | | | | 192/219.5 |
| 2014/0346004 | A1 | 11/2014 | Landino et al. | |
| 2016/0033037 | A1 * | 2/2016 | Rhoades | F16H 63/3433 |
| | | | | 74/411.5 |
| 2019/0264807 | A1 | 8/2019 | Kimura et al. | |
| 2023/0076082 | A1 * | 3/2023 | Hou | F16H 63/3491 |

FOREIGN PATENT DOCUMENTS

| | | |
|---|---|---|
| CN | 207762238 U | 8/2018 |
| CN | 208951285 U | 6/2019 |
| CN | 110425277 A | 11/2019 |
| EP | 3545216 A1 | 10/2019 |
| JP | 2011098677 A | 5/2011 |
| JP | 2016511382 A | 4/2016 |
| JP | 2019056484 A | 4/2019 |
| TW | I667425 B | 8/2019 |
| WO | 2011090614 A2 | 7/2011 |
| WO | 2018232121 A1 | 12/2018 |

OTHER PUBLICATIONS

PCT International Search Report and Written Opinion dated Aug. 10, 2020 issued in PCT Application No. PCT/CN2020/071267.
Office Action in JP2022539236, dated Sep. 1, 2023, 4 pages.

* cited by examiner

US 11,965,594 B2

ELECTRONIC PARKING BRAKE MECHANISM

CROSS-REFERENCE TO RELATED APPLICATIONS

This application is a National Phase of PCT/CN2020/071267, filed on Jan. 10, 2020, which claims priority to Chinese Patent Application No. 201911364191.9, filed on Dec. 26, 2019, the disclosures of each of which are hereby incorporated by reference in their entireties.

TECHNICAL FIELD

The present disclosure relates to the field of parking control, in particular to an electronic parking mechanism.

BACKGROUND

The electronic parking mechanism of gearbox is a mechanism for preventing the vehicle from sliding forward or backward when the vehicle is parked on a road or a ramp. At present, most electronic parking mechanisms of gearbox in new energy vehicles have insufficient structural flexibility and short service life. Moreover, the mechanical unlocking mechanism is provided at the worm of the parking motor; when the parking motor is powered off, this unlocking method requires the driver to operate under the vehicle to perform mechanical unlocking, and thus has low safety and poor comfort.

SUMMARY

In view of the above problems, the present disclosure provides an electronic parking mechanism to solve or partially solve the above problems.

In order to achieve the above object, the present disclosure adopts the following technical solutions.

The present disclosure provides an electronic parking mechanism, comprising a parking cam assembly, a pawl assembly and a parking gear;

the parking cam assembly comprises a parking guide shaft and a parking cam, the parking cam is sleeved on the parking guide shaft, and one side of the parking cam is provided with an arc protrusion along a circumferential direction;

the pawl assembly comprises a pawl and a pawl shaft, an upper part of the pawl can contact the side of the parking cam which is provided with the arc protrusion, the pawl shaft is provided on a side of the pawl, and the pawl can rotate around the pawl shaft;

As the parking cam rotates, the pawl assembly is in a first position where the pawl assembly parks in the parking gear and a second position where the pawl assembly parks out the parking gear, respectively. The parking gear is non-rotatable or rotatable depending on whether the pawl assembly is in the first position or the second position.

Further, a protrusion of the parking cam is provided with a circumferential contour extending along an axial direction of the parking guide shaft, the arc protrusion is provided on an outer side of the circumferential contour, and the parking cam assembly further comprises an axial limit block and a parking cam limit plate;

the parking cam limit plate is fixed on the parking guide shaft, the axial limit block is sleeved on the parking guide shaft with an interference fit, the parking cam is sleeved on the parking guide shaft between the axial limit block and the parking cam limit plate, and the parking cam limit plate can drive the parking cam to rotate.

Further, the parking cam limit plate comprises at least a first blade and a second blade spaced apart from each other, the first blade and the second blade are respectively provided on two sides of the protrusion;

a side of the first blade facing the protrusion is provided with a first spring column, the protrusion is provided with a corresponding second spring column, and a spring is sleeved on the first spring column and the second spring column; and the second blade is formed with a curved claw, and the curved claw can butt against the other side of the protrusion.

Further, the parking guide shaft comprises a flat part on one end thereof and a circular part on the other end thereof, the parking guide shaft runs through casings of a gearbox, the flat part of the parking guide shaft is connected with a parking motor, and the parking motor drives the parking guide shaft to rotate.

Further, the parking cam assembly further comprises a thrust bearing, the thrust bearing is sleeved on the parking guide shaft, and an outer edge of the thrust bearing is fixed on a left-side casing of the gearbox with an interference fit.

Further, the pawl assembly further comprises a roller, a roller pin and a torsion spring;

an upper part of the pawl is provided with a groove, the roller is fixed in the groove through the roller pin, the roller can be in contact with the parking cam, and a lower part of the pawl is provided with a boss which can engage with the parking gear;

one side of the pawl is sleeved on the pawl shaft, the pawl shaft is fixed on casings on both sides of the gearbox, and the pawl can rotate around the pawl shaft;

one end of the torsion spring is fixed on the casings of the gearbox, and the other end of the torsion spring is fixed on the pawl, so that the pawl is pre-pressed against the parking cam.

Further, the electronic parking mechanism further comprises a mechanical unlocking device, the mechanical unlocking device comprises an elastic member and an actuator, and the actuator drives the parking guide shaft to move along an axial direction so that the parking cam and the upper part of the pawl are respectively butted against the arc protrusion or the parking cam is at a side of the arc protrusion in the axial direction.

Further, the actuator is a pull wire or pull rod, one end of the pull wire or pull rod is connected to one end of the parking guide shaft, the other end of the pull wire or pull rod is connected to a controller in the cab, and the pull rod or pull rod provides an axial force for an axial movement of the parking guide shaft.

Further, the elastic member is a spring kit, the spring kit is provided between the parking cam assembly and a right-side casing of the gearbox, and the elastic member is preset with a preload when being installed.

Further, a guide groove for accommodating the parking guide shaft is provided on an inner side of the right-side casing of the gearbox, and a sealing ring for sealing the parking guide shaft is provided in the guide groove.

The above electronic parking mechanism has the following advantages:

Through the specific structure of the parking cam assembly and pawl assembly, the connection of the electronic parking mechanism and the flexibility of the driving process are ensured, thereby increasing the operability and service life of the electronic parking mechanism.

Moreover, the electronic parking mechanism can provide the emergency mechanical unlocking function when the parking motor is powered off. The parking guide shaft is connected with the pull rod or pull wire outside the gearbox, so that the driver can realize the mechanical unlocking in the cab. Because the electronic parking mechanism can realize the pure mechanical unlocking without power supply in the cab, the driver does not need to get off the vehicle for operation, and thus it has high safety and good operation comfort.

The above is only an overview of the technical solutions of the present disclosure. In order to better understand the technical means of the present disclosure so that it can be implemented according to the contents of the description, and in order to make the above and other objects, features and advantages of the present disclosure more obvious and easy to understand, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, like reference numerals denote like components. In the drawings.

Figure 1:
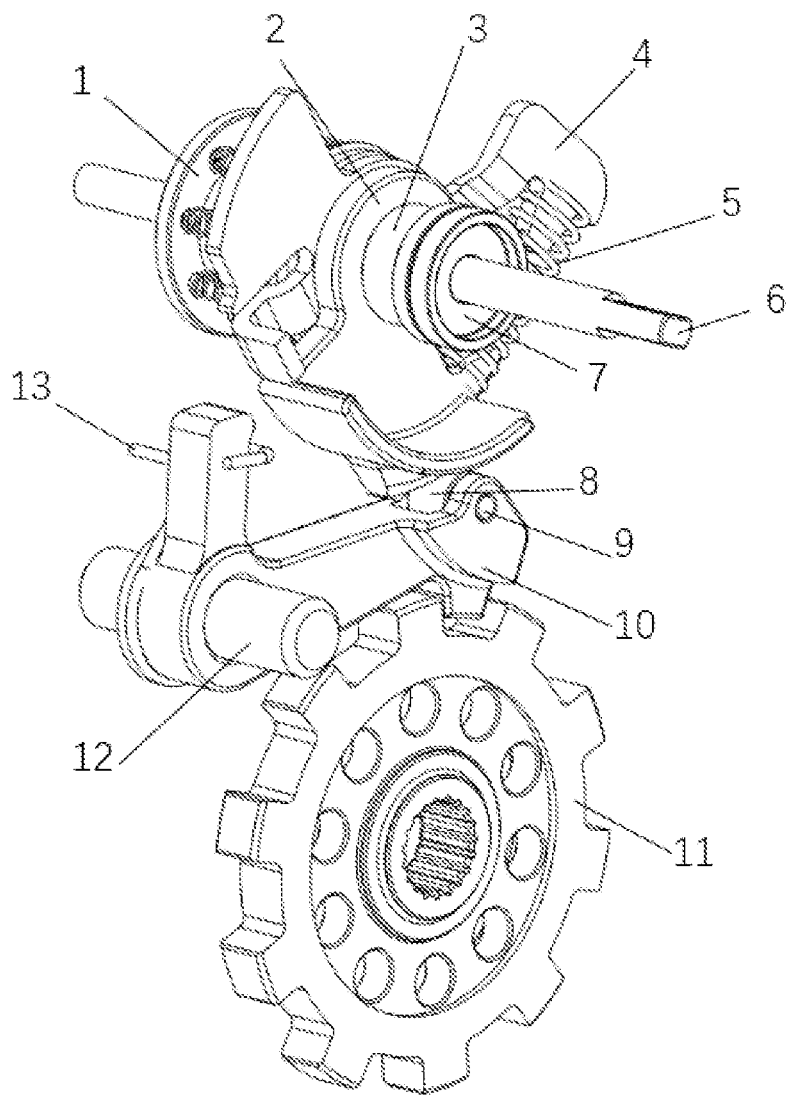
FIG. 1 is a schematic view of the structure of an electronic parking mechanism according to an embodiment of the present disclosure.

In the drawings: 1. elastic member, 2. parking cam, 3. axial limit block, 4. parking cam limit plate, 5. spring, 6. parking guide shaft, 7. thrust bearing, 8. roller, 9. roller pin, 10. pawl, 11. parking gear, 12. pawl shaft, 13. torsion spring, 14. sealing ring, 15. Right casing of the gearbox, 16. Left casing of the gearbox.

DETAILED DESCRIPTION

Illustrative embodiments of the present disclosure will be described in more detail with reference to the drawings. Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

Figure 2:
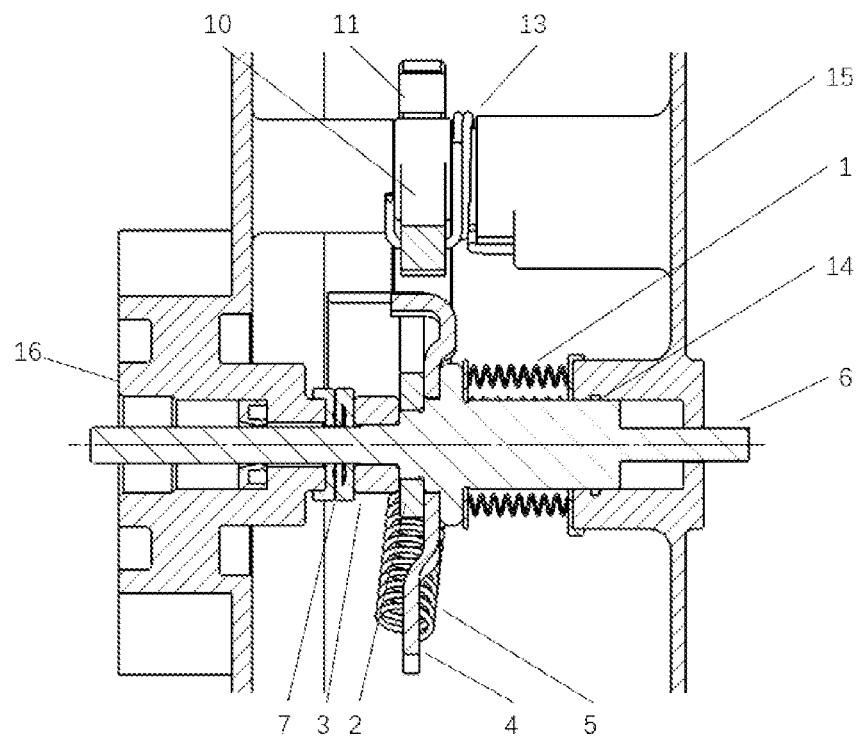
FIG. 2 is a schematic sectional view of the electronic parking mechanism in a parking-in state according to an embodiment of the present disclosure.
Figure 3:
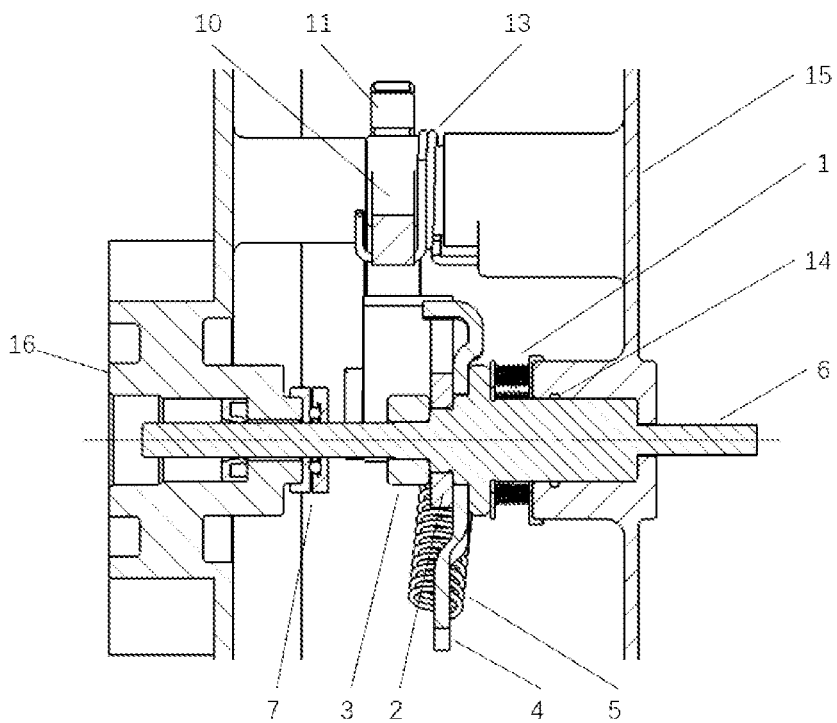
FIG. 3 shows a schematic sectional view of the electronic parking mechanism after mechanical unlocking according to an embodiment of the present disclosure.
Figure 4:
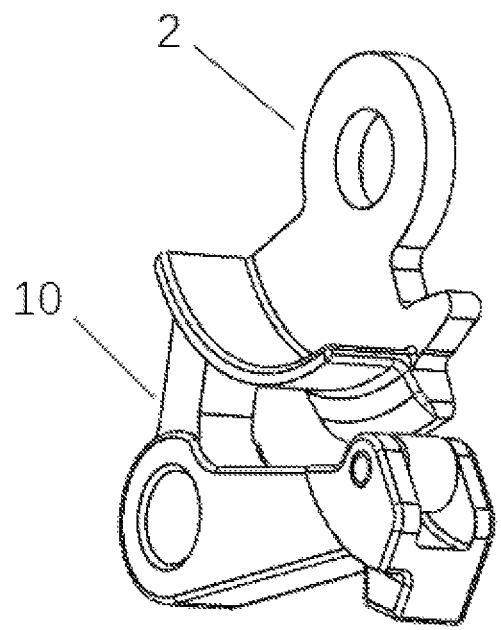
FIG. 4 is a schematic view of the structure of a parking cam and a pawl in a parking-in state according to an embodiment of the present disclosure.
Figure 5:
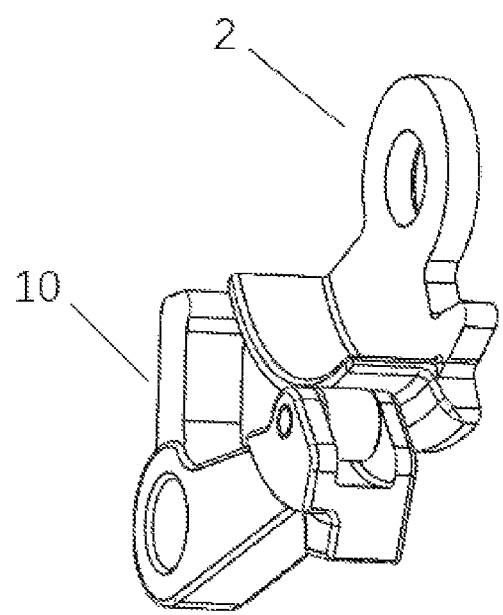
FIG. 5 is a schematic view of the structure of a parking cam and a pawl after mechanical unlocking according to an embodiment of the present disclosure.

FIG. 1 is a schematic view of the structure of an electronic parking mechanism according to an embodiment of the present disclosure; FIG. 2 is a schematic sectional view of the electronic parking mechanism in a parking-in state according to an embodiment of the present disclosure; FIG. 3 shows a schematic sectional view of the electronic parking mechanism after mechanical unlocking according to an embodiment of the present disclosure; FIG. 4 is a schematic view of the structure of a parking cam and a pawl in a parking-in state according to an embodiment of the present disclosure; and FIG. 5 is a schematic view of the structure of a parking cam and a pawl after mechanical unlocking according to an embodiment of the present disclosure.

As shown in FIG. 1, an embodiment of the present disclosure proposes an electronic parking mechanism, which comprises a parking cam assembly, a pawl assembly and a parking gear 11.

The parking cam assembly comprises a parking guide shaft 6 and a parking cam 2. The parking cam 2 is sleeved on the parking guide shaft 6. One side of the parking cam 2 is provided with an arc protrusion along the circumferential direction. Depending on whether the pawl assembly butts against the arc protrusion on the parking cam 2 as the parking cam 2 rotates, the pawl assembly is controlled to be in a first position where the pawl assembly parks in the parking gear 11 and a second position where the pawl assembly parks out the parking gear 11.

The pawl assembly comprises a pawl 10 and a pawl shaft 12. The upper part of the pawl 10 can contact the parking cam 2. The pawl shaft 12 is provided on one side of the pawl 10, and the pawl 10 can rotate around the pawl shaft 12.

With the rotation of the parking cam 2 and the rotation of the pawl 10 around the pawl shaft 12, the parking gear 11 is in two states, namely, the non-rotatable state or the rotatable state, respectively, so as to realize parking or driving.

In sum, in the embodiment of the present disclosure, the parking guide shaft 6 rotates and drives the parking cam 2 to rotate. When the arc protrusion provided on the parking cam 2 contacts the pawl assembly, the arc protrusion presses the pawl assembly downward to make it in the first position where the pawl assembly parks in the parking gear 11; and when the arc protrusion is separated from the pawl assembly, the pawl assembly is separated from the parking gear 11 and is in the second position where the pawl assembly parks out the parking gear 11, thereby realizing the flexible parking of the vehicle and obtaining a better parking effect.

In an embodiment, the protrusion of the parking cam 2 is provided with a circumferential contour extending along an axial direction of the parking guide shaft 6, and the arc protrusion is provided on an outer side of the circumferential contour. When the circumferential contour on the parking cam 2 contacts the parking pawl assembly, the parking pawl assembly is in the second position where the pawl assembly parks out the parking gear 11, the circumferential contour serves to define the position of the parking pawl assembly and makes the parking pawl assembly move within a certain range. The parking cam assembly also comprises an axial limit block 3 and a parking cam limit plate 4.

The parking cam limit plate 4 is fixed on the parking guide shaft 6, the axial limit block 3 is sleeved on the parking guide shaft 6 with an interference fit, the parking cam 2 is sleeved on the parking guide shaft 6 between the axial limit block 3 and the parking cam limit plate 4, and the parking cam limit plate 4 can drive the parking cam 2 to rotate. The axial limit block 3 defines the position of the parking cam 2, and the parking cam 2 can rotate flexibly on the parking guide shaft 6 between the axial limit block 3 and the parking cam limit plate 4.

In an embodiment, as shown in FIG. 1, the parking cam limit plate 4 comprises at least a first blade and a second blade spaced apart from each other, the first blade and the second blade are respectively provided on two sides of the protrusion; a side of the first blade facing the protrusion is provided with a first spring column, the protrusion is provided with a corresponding second spring column, and a spring 5 is sleeved on the first spring column and the second spring column; and the second blade is formed with a curved claw, and the curved claw can butt against the other side of the protrusion. When the parking state is changed from parking-in to parking-out, the parking guide shaft 6 rotates counterclockwise to drive the parking limit plate 4 to rotate counterclockwise. The curved claw on the parking limit plate 4 butts against the parking cam 2 to drive the parking cam 2 to rotate counterclockwise. At this point, the arc protrusion is separated from the pawl assembly, the circumferential contour is in contact with the pawl assembly, and the pawl assembly is separated from the parking gear 11 to realize the parking-out operation. When the parking state is changed from parking-out to parking-in, the parking guide shaft 6 rotates clockwise to drive the parking limit plate 4 to rotate clockwise. The first spring column on the parking limit plate 4 presses the spring 5 downward, and drives the parking cam 2 to rotate clockwise due to the action of the spring 5. At this point, the circumferential contour is separated from the pawl assembly, the arc protrusion contacts the pawl assembly, and presses the pawl assembly downward to engage with the parking gear 11, thereby realizing the parking-in operation. The position relationship between the parking cam 2 and the pawl 10 in the parking-in state is shown in FIG. 4.

In an embodiment, the parking guide shaft 6 comprises a flat part on one end thereof and a circular part on the other end thereof. The parking guide shaft 6 runs through the casings of the gearbox. The flat part of the parking guide shaft 6 is connected with a parking motor, and the parking motor drives the parking guide shaft 6 to rotate. The setting of the flat part in this embodiment facilitates the connection and driving of the parking motor. Of course, the flat part is not necessary, and any structure that can realize the detachable connection with the parking motor is within the protection scope of the present disclosure.

In an embodiment, the parking cam assembly further comprises a thrust bearing 7, the thrust bearing 7 is sleeved on the parking guide shaft 6, and an outer edge of the thrust bearing 7 is fixed on a left-side casing 16 of the gearbox with an interference fit. The setting of the thrust bearing 7 ensures that the parking cam assembly can rotate flexibly.

In an embodiment, as shown in FIG. 1, the pawl assembly further comprises a roller 8, a roller pin 9 and a torsion spring 13.

In order to improve the connection reliability between the pawl 10 and the parking cam 2, reduce the friction and wear of the joint part between the upper part of the pawl 10 and the parking cam 2, and improve its service life, the upper part of the pawl 10 is provided with a groove, the roller 8 is fixed in the groove through the roller pin 9, the roller 8 can be in contact with the parking cam 2, and the lower part of the pawl 10 is provided with a boss which can engage with the parking gear 11.

When the electronic parking mechanism is in the parking state, the pawl 10 is pressed downward by the parking cam 2 so that the boss at the lower part of the pawl 10 engages with the parking gear 11 to realize parking-in. One side of the pawl 10 is sleeved on the pawl shaft 12, the pawl shaft 12 is fixed on the casings on both sides of the gearbox, and the pawl 10 can rotate around the pawl shaft 12. One end of the torsion spring 13 is fixed on the casings of the gearbox, and the other end is fixed on the pawl 10. The torsion spring 13 has a certain preload when being installed. The preload always raises the pawl 10 upward, so that the pawl 10 is pre-pressed against the parking cam 2. The roller 8 can roll around the roller pin 9 to reduce the friction between the parking cam 2 and the pawl 10. The roller 8 contacts the circumferential contour or arc protrusion on the parking cam 2.

In an embodiment, the electronic parking mechanism further comprises a mechanical unlocking device, the mechanical unlocking device comprises an elastic member 1 and an actuator. The actuator is connected with the circular part of the parking guide shaft 6. The actuator drives the parking guide shaft 6 to move along an axial direction so that the upper part of the pawl 10 are respectively butted against the arc protrusion or a side of the parking cam 2 in the axial direction of the arc protrusion.

When the parking motor is powered off and the electronic parking mechanism is in the parking state, the actuator can drive the parking guide shaft 6 to move axially, and then drive the parking cam 2 to move axially, so that the arc protrusion on the parking cam 2 is separated from the roller 8, the circumferential contour is in contact with the roller 8, the pawl 10 will be raised up under the force of the torsion spring 13, and the boss at the lower part of the pawl 10 is separated from the parking gear 11 to realize the parking-out, thereby ensuring that the parking mechanism can be unlocked when the vehicle has no power. The position relationship between the parking cam 2 and the pawl 10 after mechanical unlocking is shown in FIG. 5.

Therefore, depending on the butting relationship between the pawl 10 and the circumferential contour of the parking cam 2, when the parking gear 11 is in the fixed state of parking-in, the upper part of the pawl 10 butts against the arc protrusion on the circumferential contour of the parking cam 2; when the parking motor works normally, the upper part of the pawl 10 butts against the circumferential contour on the side of the arc protrusion in the circumferential direction; after unlocking by the mechanical unlocking device, the upper part of the pawl 10 butts against the circumferential contour on the side of the arc protrusion in the axial direction.

In an embodiment, the actuator is a pull wire or pull rod, one end of the pull wire or pull rod is connected to one end of the parking guide shaft 6, and the other end of the pull wire or pull rod is connected to a controller in the cab. The pull rod or pull rod provides an axial force for the axial movement of the parking guide shaft 6 to make the parking guide shaft 6 move axially in the direction of the end of the circular part. The other end of the pull wire or pull rod is provided in the cab, so that it is convenient for the driver to unlock the parking mechanism in the cab through the pull wire or pull rod.

In an embodiment, the elastic member 1 is a spring kit. As shown in FIG. 2 and FIG. 3, the spring kit is provided between the parking cam assembly and the right-side casing 15 of the gearbox, and the elastic member 1 is preset with a preload when being installed. Due to the preload, the elastic member 1 is in close proximity to the right-side casing 15 of the gearbox. When the electronic parking mechanism is mechanically unlocked, the parking cam assembly moves axially in the direction of the end of the circular part of the parking guide shaft 6, and the elastic member 1 is further pressed toward the right-side casing 15 of the gearbox.

In an embodiment, as shown in FIG. 2 and FIG. 3, a cylindrical protrusion is provided on the inner side of the right-side casing 15 of the gearbox, which includes a guide groove for accommodating the parking guide shaft 6, and a sealing ring 14 for sealing the parking guide shaft 6 is provided in the guide groove. The circular part of the parking guide shaft 6 can move axially in the guide groove to realize mechanical unlocking. The sealing ring 14 is provided at the contact part between the guide groove and the parking guide shaft 6 to seal and prevent dust from entering the gearbox.

In sum, the present disclosure provides an electronic parking mechanism, which comprises a parking cam assembly, a pawl assembly and a parking gear; the parking cam assembly comprises a parking guide shaft and a parking cam, the parking cam is sleeved on the parking guide shaft, and one side of the parking cam is provided with an arc protrusion along a circumferential direction so that as the parking cam rotates, the pawl assembly is in a first position where the pawl assembly parks in the parking gear and a second position where the pawl assembly parks out the parking gear, respectively; the pawl assembly comprises a pawl and a pawl shaft, an upper part of the pawl can contact the parking cam, the pawl shaft is provided on a side of the pawl, and the pawl can rotate around the pawl shaft. The electronic parking mechanism according to the present disclosure can realize flexible contact and driving. It provides the emergency mechanical unlocking function when the parking motor is powered off. The parking guide shaft is connected with the pull rod or pull wire outside the gearbox, which can realize the mechanical unlocking by the driver in the cab. The electronic parking mechanism can realize the pure mechanical unlocking without power supply in the cab, and it does not need the driver to get off the vehicle for operation, and thus it has high safety and good operation comfort.

The above are only the specific embodiments of the present disclosure, and the protection scope of the present disclosure is not limited to this. Any person skilled in the art can easily think of changes or substitutions within the technical scope disclosed by the present disclosure, which should be covered by the protection scope of the present disclosure.

In the description provided herein, a large number of specific details are described. However, it can be understood that embodiments of the present disclosure can be practiced without these specific details. In some embodiments, well-known methods, structures and techniques are not shown in detail so as not to obscure the understanding of this specification.

What is claimed is:

1. An electronic parking mechanism, comprising:
a parking cam assembly that includes a parking guide shaft, a parking cam, an axial limit block and a parking cam limit plate, wherein the parking cam is sleeved on the parking guide shaft, a protrusion of the parking cam is provided with a circumferential contour extending along an axial direction of the parking guide shaft, and one side of the parking cam is provided with an arc protrusion along a circumferential direction, and the arc protrusion is provided on an outer side of the circumferential contour, wherein the parking cam limit plate is fixed on the parking guide shaft, the axial limit block is sleeved on the parking guide shaft with an interference fit, the parking cam is sleeved on the parking guide shaft between the axial limit block and the parking cam limit plate, and the parking cam limit plate is configured to drive the parking cam to rotate;
a pawl assembly that includes a pawl and a pawl shaft, an upper part of the pawl is configured to contact the side of the parking cam that is provided with the arc protrusion, the pawl shaft is provided on a side of the pawl, and the pawl is configured to rotate around the pawl shaft; and
a parking gear;
wherein, as the parking cam rotates, the pawl assembly is in a first position where the pawl assembly parks in the parking gear and a second position where the pawl assembly parks out the parking gear, respectively, and
wherein in the first position the upper part of the pawl butts against the arc protrusion, and the parking gear is non-rotatable; in the second position the upper part of the pawl butts against the circumferential contour on the side of the arc protrusion in the circumferential direction, and the parking gear is rotatable.

2. The electronic parking mechanism according to claim 1, wherein the parking cam limit plate comprises at least a first blade and a second blade spaced apart from each other, the first blade and the second blade are respectively provided on two sides of the protrusion;
a side of the first blade facing the protrusion is provided with a first spring column, the protrusion is provided with a corresponding second spring column, and a spring is sleeved on the first spring column and the second spring column; and
the second blade is formed with a curved claw, and the curved claw is configured to butt against the other side of the protrusion.

3. The electronic parking mechanism according to claim 2, further comprising a mechanical unlocking device that includes an elastic member and an actuator, and when unlocking, the actuator drives the parking guide shaft to move along an axial direction so that before unlocking the upper part of the pawl butts against the arc protrusion, and after unlocking the upper part of the pawl butts against the circumferential contour on the side of the arc protrusion in the axial direction.

4. The electronic parking mechanism according to claim 1, wherein the parking guide shaft comprises a flat part on one end thereof and a circular part on the other end thereof, the parking guide shaft runs through casings of a gearbox, the flat part of the parking guide shaft is connected with a parking motor, and the parking motor drives the parking guide shaft to rotate.

5. The electronic parking mechanism according to claim 4, further comprising a mechanical unlocking device that includes an elastic member and an actuator, and when unlocking, the actuator drives the parking guide shaft to move along an axial direction so that before unlocking the upper part of the pawl butts against the arc protrusion, and after unlocking the upper part of the pawl butts against the circumferential contour on the side of the arc protrusion in the axial direction.

6. The electronic parking mechanism according to claim 1, wherein the parking cam assembly further comprises a thrust bearing that is sleeved on the parking guide shaft, and an outer edge of the thrust bearing is fixed on a left-side casing of the gearbox with an interference fit.

7. The electronic parking mechanism according to claim 6, further comprising a mechanical unlocking device that includes an elastic member and an actuator, and when unlocking, the actuator drives the parking guide shaft to move along an axial direction so that before unlocking the upper part of the pawl butts against the arc protrusion, and after unlocking the upper part of the pawl butts against the circumferential contour on the side of the arc protrusion in the axial direction.

8. The electronic parking mechanism according to claim 1, wherein the pawl assembly further comprises a roller, a roller pin and a torsion spring;
   an upper part of the pawl is provided with a groove, the roller is fixed in the groove through the roller pin, the roller is configured to contact the parking cam, and a lower part of the pawl is provided with a boss configured to engage the parking gear;
   one side of the pawl is sleeved on the pawl shaft, the pawl shaft is fixed on casings on both sides of the gearbox, and the pawl is configured to rotate around the pawl shaft; and
   one end of the torsion spring is fixed on the casings of the gearbox, and the other end of the torsion spring is fixed on the pawl, so that the pawl is pre-pressed against the parking cam.

9. The electronic parking mechanism according to claim 8, further comprising a mechanical unlocking device that includes an elastic member and an actuator, and when unlocking, the actuator drives the parking guide shaft to move along an axial direction so that before unlocking the upper part of the pawl butts against the arc protrusion, and after unlocking, the upper part of the pawl butts against the circumferential contour on the side of the arc protrusion in the axial direction.

10. The electronic parking mechanism according to claim 1, further comprising a mechanical unlocking device that comprises an elastic member and an actuator, and when unlocking, the actuator drives the parking guide shaft to move along an axial direction so that before unlocking the upper part of the pawl butts against the arc protrusion, and after unlocking the upper part of the pawl butts against the circumferential contour on the side of the arc protrusion in the axial direction.

11. The electronic parking mechanism according to claim 10, wherein the actuator is a pull wire or pull rod, one end of the pull wire or pull rod is connected to one end of the parking guide shaft, the other end of the pull wire or pull rod is connected to a controller in a cab of a vehicle including the electronic parking mechanism, and the pull wire or pull rod provides an axial force for axial movement of the parking guide shaft.

12. The electronic parking mechanism according to claim 10, wherein the elastic member is a spring kit disposed between the parking cam assembly and a right-side casing of the gearbox, and the elastic member is preset with a preload when being installed.

13. The electronic parking mechanism according to claim 12, wherein a guide groove for accommodating the parking guide shaft is provided on an inner side of the right-side casing of the gearbox, and a sealing ring for sealing the parking guide shaft is provided in the guide groove.

* * * * *